No. 701,208. Patented May 27, 1902.
C. LUKE.
CABLE CONNECTION.
(Application filed Jan. 16, 1902.)
(No Model.)

Witnesses.
Thomas J. Drummond.
Edward H. Allen.

Inventor.
Charles Luke,
By Dudley Gregory
Atty's

THE NORRIS PETERS CO., PHOTO-LITHO., WASHINGTON, D. C.

UNITED STATES PATENT OFFICE.

CHARLES LUKE, OF MILFORD, CONNECTICUT, ASSIGNOR TO NEW HAVEN NOVELTY MACHINE COMPANY, OF NEW HAVEN, CONNECTICUT.

CABLE CONNECTION.

SPECIFICATION forming part of Letters Patent No. 701,208, dated May 27, 1902.

Application filed January 16, 1902. Serial No. 89,942. (No model.)

*To all whom it may concern:*

Be it known that I, CHARLES LUKE, a citizen of the United States, residing at Milford, county of New Haven, State of Connecticut, have invented an Improvement in Cable Connections, of which the following description, in connection with the accompanying drawings, is a specification, like characters on the drawings representing like parts.

Electric cables for underground and overhead work are commonly inclosed in a lead pipe. The length of a cable and its pipe-covering is always less than the circuit to be supplied with power or light, and consequently the cables and the lead covering have to be joined frequently. In joining this class of cable it is customary to remove the lead pipe at the end of each length of cable and remove from the individual wires its insulation, usually of textile material of some sort, and join electrically together the bare wires, and thereafter to prevent moisture entering the cable, where joined together or spliced, it is customary to reinclose the part of the cable projecting from beyond the ends of the lead-pipe covering in a lead jacket, which is wrapped about the splice and connected with the ends of the lead pipe at opposite sides the splice, the jacket being soldered together and being united by a wiped joint to the lead pipe. This operation requires the use of a plumber, and frequently, owing to conditions of the weather, a wiped joint cannot be made, and the production of a wiped joint in a manhole or in the air, if the cable is elevated, requires a very considerable time and is effected only at very considerable inconvenience. To obviate the employment of a plumber and the making of any wiped joints or the use of molten lead in laying a cable, I have devised a cable pipe connection composed of several parts united by screw-threads, said parts being applied directly to the ends of the pipe and covering the splice between the ends of the pipes of adjacent lengths of cable air and water tight, and by the use of the connections to be herein described great economy is effected and even greater security as against the entrance of water or moisture to the cable is secured and the connection may be unmade quickly at any time desired.

The connection herein shown is also adapted to enable a cable to be branched off from the main cable to do work at an outlying substation.

Figure 2:
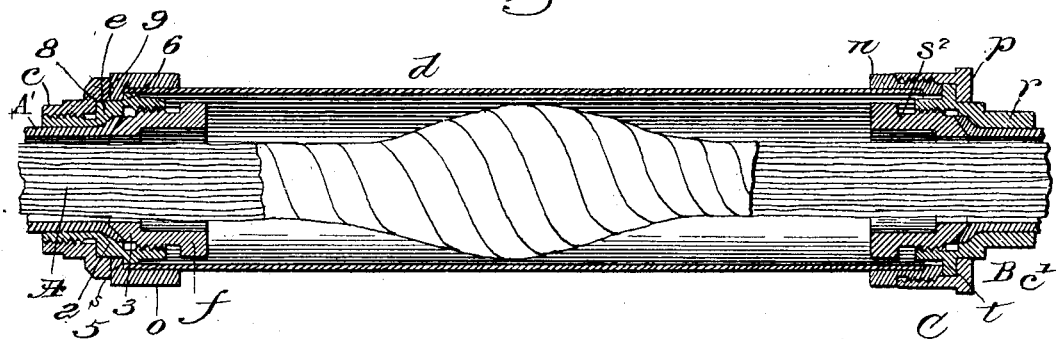
Figure 1:
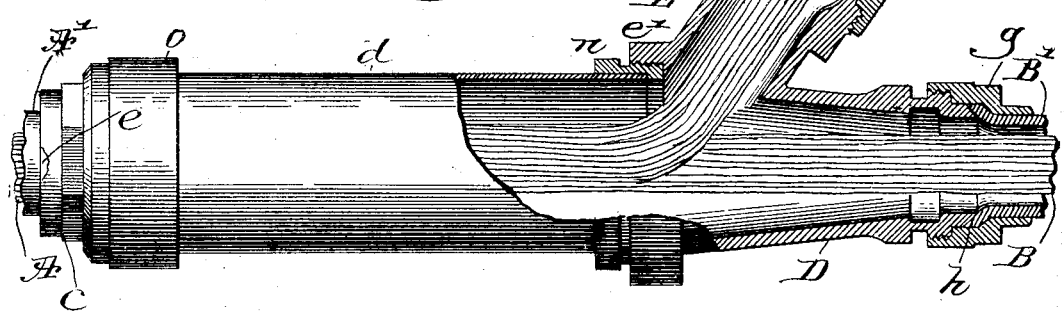
Figure 3:
Figure 4:
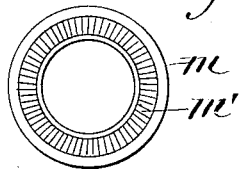

Figure 1, in longitudinal section, represents a connection embodying my invention, the connection having a branch leading therefrom. Fig. 2 shows a connection without a branch. Fig. 3 represents parts of two strands of wire with their insulation partially removed at their points of junction. Fig. 4 is a face view of the part *m* to show how it is scored.

Referring to the drawings, A B represent, it will be supposed, the ends of two lengths of cable comprising numerous wires, each wrapped in usual insulation, which may be fibrous material, either cloth or paper, to prevent contact of one wire with another and also to exclude moisture from the wire.

The entire mass of covered wires is inclosed snugly in lead pipe A' B', and let it be supposed that the wires of the two cables are to be united to complete a circuit. To do this, the lead pipe is removed from the ends of the cable to be joined for a distance of several inches from the end thereof. To join the cables, I first slip over the cable A—connected, let it be supposed, with the power plant— and over the lead pipe A', covering the same, a nut *c*, and then I slip over the same parts the tubular body *d* of the connection to be described, and I then in like manner slip over the said parts the outer clamping member *e*, pushing all of said parts back to the left, viewing Figs. 1 and 2, beyond the end of the lead pipe. I then insert a portion of a suitable tool between the mass of cables and the interior of the lead pipe A' at the end thereof, and by movement of said tool flare outwardly the end of the pipe, as represented at 2. This done I slip the inner clamping member *f* over the wires of the cable and insert its tapered end 3 in the outflared end of the lead pipe, and by a suitable wrench or tool I turn the inner clamping member *f* so that its external screw-threads, in engagement with the internal screw-threads at the right-hand end of the outer clamping member *e*, which has been drawn to the end of the pipe, will cause the internal member to be forced into the inner end of the pipe and into the exterior clamping member until the end of the lead pipe is clamped between the members $e$ and $f$ water and air tight.

In case a portion of the wires of the cable A' are to be joined with the wires of a cable B and with a branch cable C, I employ an extension D, having, it may be, one or more lateral branches E. In using this branch I slip over the end of the wires of the cable B and over the lead-pipe covering B' thereof an outer clamping member, as $g$, thereafter flaring outwardly, as described, the end of the lead pipe B', and I pass the body $d$ and the extension D to the left, that the ends of the wires of the cables A and B may be soldered together in usual manner, and then the extension D may be moved to the right until the tapered end of the inner coupling member $h$ enters the pipe B', where it is outwardly flared, and I thereafter rotate the extension D, causing its external screw-threads, in engagement with the internal screw-threads of the clamping member $g$, to enter the end of the pipe and also the external clamping member and clamp the end of the pipe B' water and air tight. While the body $d$ is yet shoved back to the left from the position, Fig. 1, to expose the parts of the wires to be united by solder, I select the wires of the cable A that are to be connected electrically with the wires $i$ of the branch cable C and lead the wires $i$ through the branch E, putting their ends near the ends of the wires of the cable A. Preparatory to leading the wires $i$ into the branch E, I slip over the lead pipe C' an outer clamping member $k$, having an internal thread, and after turning outwardly or flanging the end of the pipe C', as shown at $n'$, I draw the wires $i$ of the cable C farther into the branch E and draw the inner side of the flange $n'$ against the scored end $m'$ of the tapered end of the inner clamping member $m$, and thereafter the outer clamping member $k$ may be turned onto the inner clamping member $m$ to firmly clamp the pipe C' between said clamping members and make a water-tight joint. The clamping member $m$ (see Fig. 4) by engaging the interior of the pipe C' at its flanged end holds the pipe firmly while member $k$ is being rotated about the pipe C'. After this the wires $i$ are soldered to the wires of the cable A. Then the body $d$ of the connection may be moved to the right and the threaded part of the ring $n$ be screwed tightly into the threaded part $e'$ of the extension, making a water-tight joint. During this movement of the body $d$ the shoulder $s$ on the ring $o$, applied, as shown, to the left-hand end of the tubular body, contacts with the outer side of the shoulder 6 of the outer clamping member $e$, and thereafter I move the nut $c$ to the right, rotating the same, said nut by reason of its external screw-threads, in engagement with the external screw-threads of the outer clamping member $e$, traveling longitudinally over said outer clamping member until the said nut meets a shoulder 8 of the outer clamping member and the end 9 of the ring $o$.

I may, if desired, employ any usual packing between any abutting surfaces of the connection described, and when the parts are thoroughly screwed up, as described, the joints made are water and air tight.

It will be obvious that the connection described may be applied quickly and readily to connect the pipe covering the ends of two or more cables and without the use of solder, and as the connection is purely mechanical it may be manipulated readily at any point and in any weather without trouble.

Fig. 2 shows a modified form of connection to join the lead-pipe coverings of two cables to be carried in the same general direction. The right-hand end of Fig. 2 shows a threaded loose nut $p$ as having been slipped over the cable B and its lead-pipe covering B', and thereafter there is slipped over said parts an outer clamping member $r$, and the end of the lead pipe is flared outwardly, that the inner tapered end of the inner clamping member $s^2$ when slipped over the cable and its external screw-threads are made to engage the external screw-threads of the outer clamping member will enter the pipe end and pinch the outwardly-flared portion water and air tight between the inner and outer clamping members. The wires of the two cables having been united, I then move the tubular body $d$ to the right until its end meets substantially the flange $t$ of the outer clamping member, and thereafter I move the loose ring $p$ from its position on the pipe B' at the right of the outer clamping member $r$ to the left and engage the inner screw-threads of said loose ring with the external screw-threads of the ring $n$, applied to the right-hand end of the tubular body $d$, and thereafter by rotating the loose nut $p$ I am enabled to make a water and air tight joint between the body and the exterior clamping-ring.

I believe that I am the first to make a mechanical joint in which the ends of the lead coverings of cables are engaged and held water-tight, the joint including a metallic sleeve the ends of which fit water-tight the members of the joint surrounding the cable, and also the first to use a sleeve of the sort in a cable connection, the sleeve having at one end a branch, that a plurality of cables may be connected with a main cable.

The invention is not limited to the exact device shown by which to connect the two-part pipe-clamping members to the sleeve or its extension or branch, and while I in some cases prefer to employ the devices constructed as shown, yet I might join the clamping members holding the lead pipes B' and C' by means of a loose or running nut, as shown at the left-hand end of Fig. 2, or by a loose nut such as commonly used in hose-coupling, said nut turning freely on the outer clamping member and engaging external screw-threads on the extension or the branch.

Having fully described my invention, what I claim as new, and desire to secure by Letters Patent, is—

1. A connection for a pipe-covered cable, comprising a tubular body to inclose the splice, and means at the opposite ends of said body to clamp the inner and outer sides of the pipe-covering water and air tight.

2. In a connection for pipe-covered cable, means to clamp the inner and outer sides of the ends of the lead pipe covering the cable water and air tight, a tubular body surrounding and connecting said clamping means, and a screw-threaded nut to retain said tubular body in position to cover the splice water and air tight.

3. A connection for covered cable, comprising means to clamp water and air tight the covering for one cable, an extension having a branch, means to connect the covering of two cables water and air tight with one end of said extension and the branch, and a tubular body coacting with said extension and the means employed for clamping the covering of another cable, to unite the means clamping the end of the cable water and air tight with said extension.

4. A connection for pipe-covered cables, comprising pipe-clamping means composed of two members to embrace the ends of the pipe between them, and a sleeve joining said pipe-clamping means and protecting the spliced wires between the ends of the pipes.

5. A connection for a pipe-covered cable comprising means to clamp the ends of the pipe, and a tubular sleeve having an interior diameter greater than the external diameter of the means for clamping the pipe whereby the sleeve may be slid longitudinally over the pipe-clamping means and pipe.

6. In a connection for a plurality of covered cables, metallic collars surrounding the covering of each cable near its end, a metallic sleeve, and a connected extension having a branch for the reception of wires of a cable to be led off laterally from the main cable, and means at the outer end of said sleeve and at one end of the extension and its branch to engage the said collar and complete a watertight joint between the covering of said cable to protect the junction of the wires thereof from water and moisture.

In testimony whereof I have signed my name to this specification in the presence of two subscribing witnesses.

CHARLES LUKE.

Witnesses:
HENRY G. THOMPSON,
GEO. E. HAIGHT.